Dec. 31, 1957  A. B. DAYTON, JR  2,817,930
APPARATUS FOR PRODUCING DECORATIVE
FINISHES ON ARTICLES
Filed Sept. 18, 1956  2 Sheets-Sheet 1

INVENTOR
ARTHUR B. DAYTON, JR
BY
Steward + Steward
his ATTORNEYS

Dec. 31, 1957  A. B. DAYTON, JR  2,817,930
APPARATUS FOR PRODUCING DECORATIVE
FINISHES ON ARTICLES
Filed Sept. 18, 1956  2 Sheets-Sheet 2

INVENTOR
ARTHUR B. DAYTON, JR.
BY
Steward & Steward
his ATTORNEYS.

United States Patent Office 2,817,930
Patented Dec. 31, 1957

2,817,930

APPARATUS FOR PRODUCING DECORATIVE FINISHES ON ARTICLES

Arthur B. Dayton, Jr., Middlebury, Conn., assignor to The Risdon Manufacturing Company, Naugatuck, Conn., a corporation of Connecticut Application September 18, 1956, Serial No. 610,621

8 Claims. (Cl. 51—135)

This invention relates to apparatus for producing decorative finishes on articles, and it relates more particularly to apparatus capable of producing a pattern of closely spaced lines on the side surfaces of a generally cylindrical object, said lines running lengthwise of the article.

In the art of decoratively finishing large quantities of similar articles, such as metal casings for lipsticks and the like, it is difficult to produce exactly the same finish or pattern on each piece. It is, nevertheless, important to do this as nearly as possible, particularly where the same finish is applied to matching pieces, as in the case of the top and bottom halves of lipstick containers, for example. Application of the design or pattern on such products by hand is time consuming and expensive, and there is no assurance that the pieces will match, especially if the finish is applied to them at different times or by different people. Moreover, in order to use a grinding belt to produce the desired pattern with the lines running lengthwise of the article, it is necessary to rotate the article as it is held in the proper position against the grinding belt. This is most difficult, if not impossible, to do by hand.

It is therefore an object of the present invention to provide a machine which will produce a finish of this kind on articles which are generally cylindrical in shape. A further and important object of the invention is to produce the finish on a large number of articles such that the finish on all the pieces is substantially identical.

Apparatus embodying the invention in its most advantageous form comprises a carriage, on which a substantially cylindrical work-piece may be resiliently mounted, for moving the work into and out of working engagement with a grinding belt arranged so that its working surface travels in a direction parallel to the longitudinal axis of the work so as to produce lines running lengthwise thereof. An endless belt disposed at right angles to the longitudinal axis of the work and substantially surrounding the carriage is mounted on pulleys and frictionally engages the side of the work opposite the grinding belt, urging the work into engagement with the grinding belt. Means are provided for driving the belt continuously in one direction in order to rotate the work as its surface is being marked, thus applying the marking all the way around the work.

The accompanying drawings, though somewhat diagrammatic, serve to illustrate in a condensed form the basic principles of the invention.

In the drawings,

Fig. 2 is a transverse section on the line 2—2 in Fig. 1, and showing the line 1—1 through the grinding machine along which Fig. 1 is taken; and Fig. 3 is a perspective view on an enlarged scale of a finished article, provided with the particular decorative finish for which the apparatus of the present invention was developed.

Figure 1:
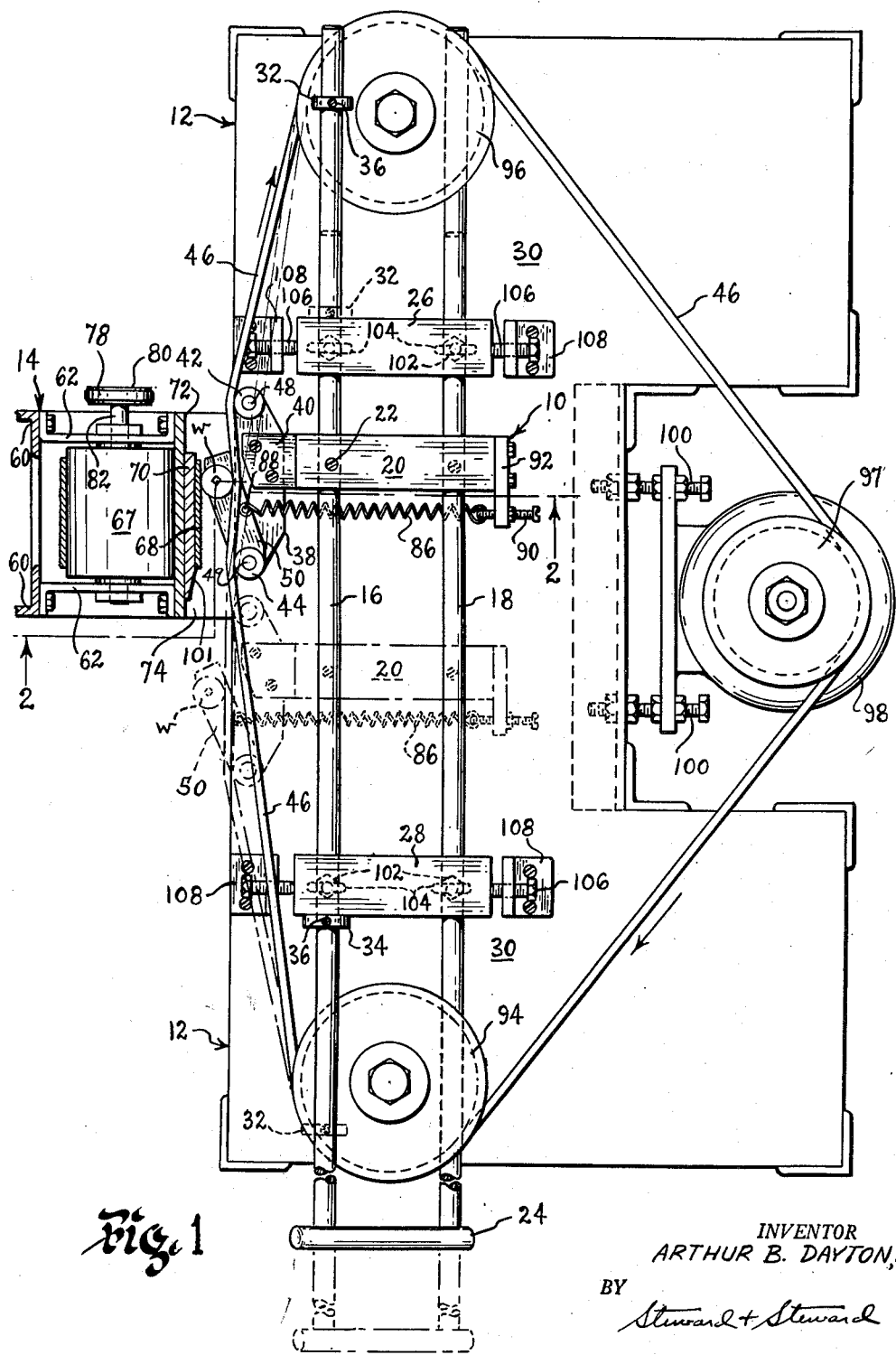
Fig. 1 is a plan view of the apparatus, partly in section.

The apparatus shown in the drawings, which is by way of example only, is designed for operation by hand but may be readily converted to automatic operation, as will be apparent hereinafter. Referring to the drawings, a carriage 10 is mounted on a frame or table 12 for horizontal reciprocal movement (indicated by the broken-line showing in Fig. 1) to and from working position relative to the working surface of a grinding machine 14 mounted to one side of carriage 10. The carriage 10 is located at a convenient height above the floor so that it can be readily manipulated by an operator standing in front of the machine. As viewed in Fig. 1, carriage 10 is a generally rectangular structure consisting of two parallel round bars or runners 16 and 18 rigidly held near their mid-portions by a heavy cross bracket 20. Runner 16 passes through the upper left-hand portion of bracket 20, as seen in Fig. 2, while runner 18 is located in the lower right-hand portion thereof, each being immovably secured thereto by means of set screws 22. A handle 24, by which the carriage may be moved into and out of working position, is provided at the forward end of the carriage and is welded or otherwise rigidly secured across the ends of both runners 16 and 18, thereby bracing this end of the carriage.

A pair of mounting blocks 26 and 28, through which runners 16 and 18 pass in longitudinal sliding engagement therewith, are supported on the top plate 30 of table 12 and are spaced apart to provide adequate room between them for bracket 20 of carriage 10 to move back and forth, into and out of working position. Mounting blocks 26 and 28 are most desirably provided with properly lubricated bearing sleeves (not shown), through which runners 16 and 18 fit in order to permit the carriage 10 to slide easily. Reciprocal movement of carriage 10 on mounting blocks 26, 28 is limited by stop-disks 32 and 34, which are apertured to fit on runner 16 and are adjustably secured thereto by means of set screws 36. Stop-disk 32 is positioned near the rear end of runner 16 limiting the forward movement of carriage 10 by engagement with the rear face of mounting block 26, as shown in broken lines in Fig. 1. Rearward movement of carriage 10 is limited by engagement of stop-disk 34 with the front face of mounting block 28, the carriage being shown in full lines in its rearmost, or working, position.

A brace 38 is bolted across the underside of an extension 40 at one end of cross bracket 20. Guide members 42 and 44 extending upwardly from brace 38 are located at opposite ends thereof and press outwardly against the inner side of an endless belt 46, which is arranged to extend both forwardly and rearwardly of guides 42, 44 and to travel in one direction continuously during operation of the machine, as will be described more fully hereinafter. Guide member 42 is most desirably an elongated roller mounted on a shaft 48 projecting upwardly from brace 38, but may, on the other hand, simply be a round stud against which belt 46 can slide. Similarly, guide 44 may also be a roller mounted on a vertical shaft 49, but in this case an arm 50 is pivoted on shaft 49 between guide roller 44 and brace 38. Arm 50 extends back from guide member 44 at an angle across belt 46 and has a work-holding spindle 54 (Fig. 2) projecting upwardly from it adjacent its free end. Spindle 54 is adapted to receive a cup-shaped work-piece w, engaged by the outer side of endless belt 46 at a point between guide rollers 42 and 44, which are located on a line substantially parallel with runners 16 and 18 of carriage 10.

The grinding machine 14 is mounted on a frame consisting of a pair of uprights 60 to which are bolted two pairs of brackets 62 for mounting trunnion plates 64.

Trunnion plates 64 are arranged in pairs to support a pair of vertically spaced pulleys 66, 67, which rotate on horizontal axes. An abrasive or grinding belt 68 is stretched over pulleys 66, 67 and engages a backing plate 70 located on the side adjacent carriage 10. Backing plate 70 is mounted on a panel 72 bolted to the ends of brackets 62 opposite uprights 60. The grinding machine 14 is rigidly mounted on the side of table 12 by means of horizontally disposed, vertically spaced plates 74 and 75 below the lower pulley 67. Angle irons 76 are welded, or otherwise made rigid, to opposite sides of plates 74 and 75 and are similarly secured to uprights 60 and to the side of table 12, as shown in Fig. 2. Uprights 60 extend down to the floor and support most of the weight of the grinding machine.

The grinding belt 68 travels in the direction indicated by the arrows in Fig. 2 so that it moves vertically downward over the backing plate 70 at a speed of, for example, 1800 feet per minute. However, since the texture of the finish on the work-piece depends in part on the speed at which the grinding belt travels, this can vary widely according to the finish desired. The lower pulley 67 is driven by means of a belt 78 on a drive wheel 80 mounted on an extension of the shaft 82 of pulley 67, the other end of belt 78 being driven by a motor 83 mounted on the bottom plate 75 of the machine. When a work-piece w is moved on its spindle 54 into working position by carriage 10, it is resiliently held by means of the endless belt 46 in contact with grinding belt 68 which travels longitudinally of the work-piece and, consequently, cuts closely spaced lines down the side thereof, forming a vertical-line pattern on the surface of the work-piece. Since belt 46 is moving perpendicularly to the work-piece, it rotates the work as it is being ground, thereby providing the vertical-line pattern uniformly on all sides of the work-piece.

While the apparatus is intended for cylindrically shaped articles such as lipstick containers or the like, such articles need not necessarily be perfectly cylindrical. For instance, the work-piece w shown in the drawings flares outwardly along a greater portion of its length. Work-pieces or shells of this particular shape therefore fit relatively loosely on the spindle 54, particularly at the wide end of the shell. However, when the shell is brought into engagement with the grinding belt 68 it pivots longitudinally on the spindle 54 to the position shown in Fig. 2. This causes the portion of the shell at the open end to project slightly away from the spindle 54 toward the grinding belt. In order to prevent excessive grinding of this portion of the shell due to the irregular profile thereof, the backing plate 70 of the grinding machine is cut away along its lower edge at 84 (Fig. 2) to conform with the profile of the shell. Thus, the grinding belt 68, which hugs the backing plate 70, likewise conforms with the profile of the shell causing the surface thereof to be marked uniformly along its length.

Figures 2, 3:
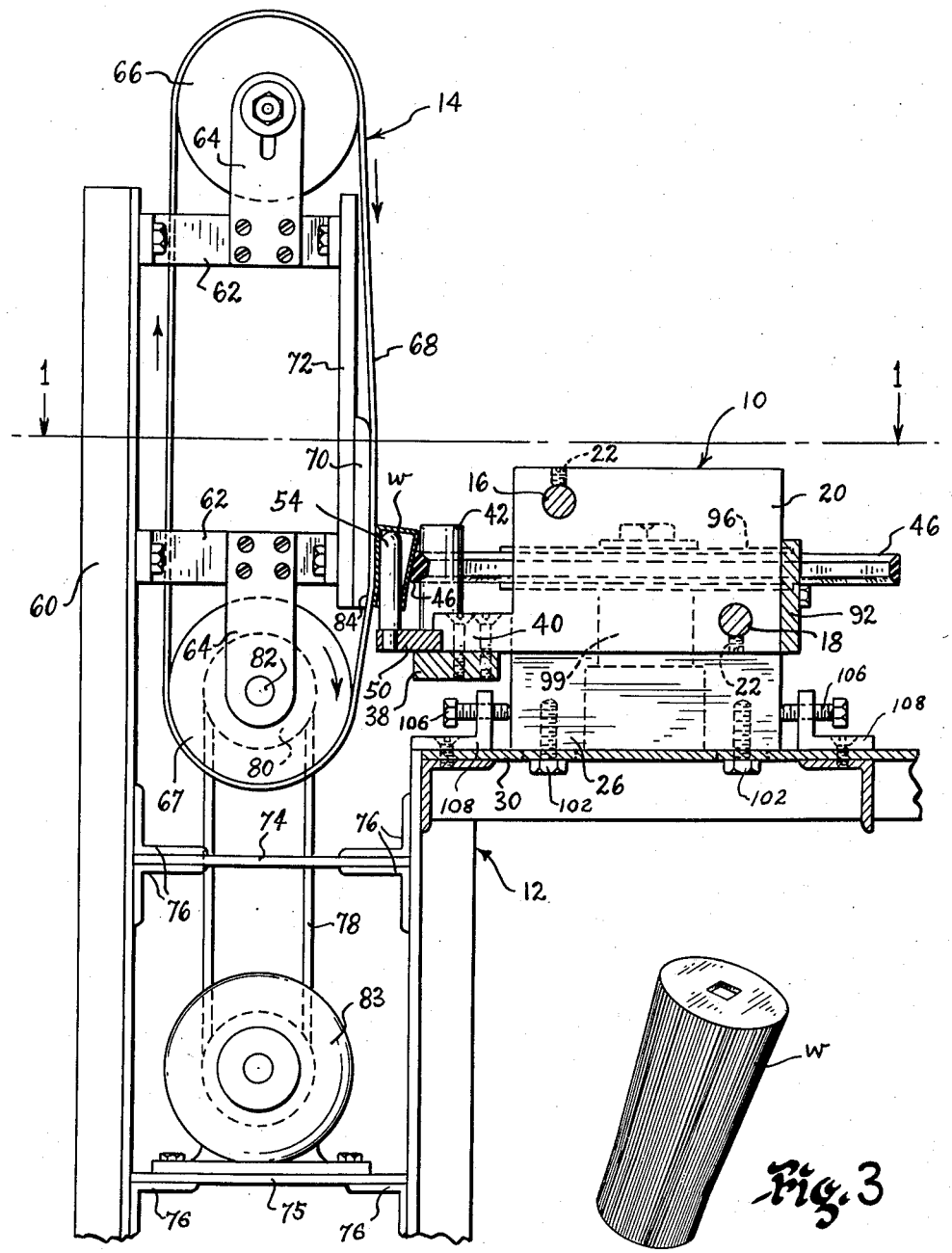

Engagement of the shell or work-piece w with the grinding belt 68 causes the work-piece to be pressed firmly against the endless belt 46 making it bow somewhat as is shown exaggerated slightly in Fig. 1. This helps to ensure uniform rotation of the work-piece by the belt 46 during the working operation. In addition, the work-piece is also urged into contact with the shell-rotating belt 46 by a coil spring 86, which is secured at one end to a pin 88 on the spindle arm 50 and at its opposite end to an adjusting screw 90 fastened to a plate 92 bolted to the end of cross bracket 20 of the carriage 10. The pull exerted by spring 86 on the spindle arm 50 can be adjusted by simply turning the adjusting screw 90 one way or the other. Adjustment of spring 86 affects both the frictional engagement of the work-piece on the belt 46 for obtaining proper rotation of the work and the force with which the work engages the grinding belt, the latter being what determines the depth of the pattern cut in the work. Furthermore, the spring 86 ensures engagement of the work w with the belt 46 even when the work is not in contact with the grinding belt 68 so that it will be rotating at the time that it is brought into contact with the grinding belt. This is important, because if the work is not rotating at the instant it is engaged by the grinding belt, a flat spot will be ground at one point in the side of the shell.

Thus, as may be seen from the broken-line showing of the carriage 10 in Fig. 1, the spindle 54 or work-piece w is at all times held in engagement with the belt 46. This means that in order for the work-piece to be placed on the spindle, one side thereof must be slipped down between the spindle and the belt 46. This may be facilitated by rounding the end of spindle 54 as shown in Fig. 2. However, since the belt 46 moves relatively slowly and is made of rubbery resilient material no difficulty is encountered in doing this in the specific apparatus disclosed herein. Nevertheless, if it is desired to have the spindle move away from the belt 46 when in its loading position, this can be readily accomplished by providing a cam device (not shown) for pivoting the spindle arm 50 counterclockwise at the end of the forward stroke of carriage 10 as it is retracted from its working position.

As may be seen in Fig. 1, belt 46 travels on pulleys 94 and 96 at the front and rear ends, respectively, of table 12 and around a drive wheel 97 on a motor 98 having a built-in reduction gear. Pulleys 94 and 96 each rotate freely about a vertical shaft in trunnion 99 (Fig. 2) fixed to top plate 30 of table 12. Since the belt 46 is most desirably of the V-belt type, pulleys 94 and 96, and drive wheel 97, are grooved accordingly. Motor 98 is mounted in a recess on one side of table 12 by means of adjusting bolts 100 which permit the motor to be moved in or out in order to adjust the tightness of belt 46. In the specific apparatus disclosed which has been used for decorating the surface of lipstick container shells which are on the order of 1¼ inches long and ⅝ inch in diameter, the belt 46 is arranged to travel at a rate of about 6 to 8 feet per minute. As shown, belt 46 substantially surrounds the carriage 10 and preferably travels in a clockwise direction, as indicated by the arrows in Fig. 1. However, the belt 46 may travel in the opposite direction, if this is found to be desirable.

In grinding the surface of shells, such as the one shown in Fig. 3, the carriage 10 is first placed in its loading position shown in broken lines in Fig. 1. It will be noted that in this position the belt 46 follows a somewhat different path as the guide rollers 42, 44, over which it rides, move forwardly. A shell is then placed on the spindle 54, in the manner already described and, since the spindle arm 50 is urged inwardly by the spring 86, the shell w is held against belt 46 and immediately begins to rotate. The operator then grasps the handle 24 and moves the carriage 10 rearwardly carrying the rotating shell first into engagement with a beveled surface 101 along the side of backing plate 70 and then onto the grinding belt 68, causing the arm 50 to pivot slightly in a clockwise direction to press the work or shell w against belt 46. The work is moved rearwardly the full width of grinding belt 68 before the stop-disk 34 engages mounting block 28 preventing further movement of carriage 10 in this direction. Where the work consists of the shells described above, each shell is held in contact with the grinding belt a total of about 3 or 4 seconds in order to ensure that it is ground uniformly on all sides. This will depend, however, upon the size of the particular work-piece. The carriage is then moved forward to its loading position where the completed work-piece is removed and a new one placed on the spindle.

It will be readily appreciated that this apparatus can be operated automatically by simply providing suitable power operating means such as hydraulic cylinders for moving the carriage 10 into and out of working position and actuating them by means of automatic controls. Moreover, the workpieces may be fed by hopper onto the spindle 54 and ejected therefrom by an air jet, for example. Such modifications are of course clearly within the scope of the invention.

Since the type and quality of finish applied by this machine is greatly affected by the force with which belt 46 urges the work into engagement with the grinding belt 68, the distance between belt 46 and grinding belt 68 may be adjusted by moving the whole carriage 10 laterally. To this end, the securing bolts 102 by which mounting blocks 26 and 28 are bolted to the top 30 of table 12 pass through elongated slots in the top plate 30, making it possible to slide the mounting blocks laterally of the table when bolts 102 are loosened. In order to provide positive adjustment, set screws 106 are threaded in angle irons 108 at each end of blocks 26 and 28, respectively. Angle irons 108 are screwed to the table 12 in spaced relation from blocks 26 and 28, and set screws 106 abut the ends thereof, as shown in the drawings. Accordingly, by letting off on the set screw at one end of a mounting block and taking up on the one at the other end when the mounting bolts 102 are loosened, the blocks 26 and 28 may each be positively and accurately moved to adjust the position of the carriage 10 laterally. This brings the belt 46 closer to or moves it farther away from the grinding belt 68 due to the fact that guide rollers 42 and 44, over which the belt 46 travels, are fixed on carriage 10.

It will be apparent from the foregoing that when the machine is set up for work-pieces of a particular size, the carriage 10 is first adjusted laterally by means of set-screws 106 to obtain approximately the right pressure on the work in order to obtain the desired depth of pattern cut. Further adjustment to improve such setting can be made by taking up on or slacking off belt 46 by means of adjusting screws 100 on motor 98. In addition, if still finer adjustment is necessary, the tension of spring 86 can be varied by means of screw 90. An important factor in producing decorative patterns by machine is to maintain the pattern as nearly the same on each article as possible in a large scale run of identical items. This is because such items are many times used in pairs, such as the top and bottom shells for lipstick containers, and any variation in the finish applied to the components in each pair becomes extremely noticeable. Thus, as the abrasive belt wears, it becomes necessary to adjust the pressure with which the work is held against the belt in order to maintain as uniform a pattern as possible. The various adjustments provided on the present apparatus are therefore of distinct advantage.

The grade and characteristics of the grinding belt used also contribute largely to the type of finish applied. In the example mentioned hereinbefore, the particular grinding belt used was a "Three-M-Ite," resin bond, 6" wide belt, having a grain size 36 and manufactured by Minnesota Mining and Manufacturing Company. Various other grades and makes of abrasive belts can of course be used to produce different effects in the finish.

It will be readily understood by those skilled in the art that while the decorative finish shown in Fig. 3 may be used in just that form, a very pleasing and quite different pattern can be produced by passing the work-piece lightly across another grinding belt to produce lines running transversely of the vertical lines already applied. This may be accomplished by suitable addition to and modification of the present apparatus, or it may be done by hand or by using an entirely separate machine to which the work-pieces are transferred.

What is claimed is:

1. Apparatus for producing surface ornamentation on generally cylindrical articles comprising in combination, a carriage mounted on a frame for reciprocal movement to and from working position, a grinding belt having a working surface located adjacent one side of said carriage, a work-holding member pivotally mounted on said one side of said carriage capable of rotatably supporting a cylindrically shaped work-piece in position for engagement with said working surface of said grinding belt when said carriage is in said working position, said grinding belt at its working surface moving in a direction parallel to the longtudinal axis of said work-piece, an endless belt disposed about pulleys mounted on said frame for movement adjacent said work-piece in a direction substantially perpendicular to said longitudinal axis thereof, said pulleys constraining said endless belt along a path substantially encircling said carriage, the portion of said path adjacent said work-piece being substantially parallel to the direction of movement of said carriage, guide means mounted on said carriage adjacent said work-holding member urging said endless belt into frictional engagement with the side of said work-piece opposite said grinding belt, the distance, during the grinding operation, between said grinding belt and said endless belt being such that said work-piece is resiliently held in contact with said grinding belt, means for driving said endless belt in one direction in order to rotate said work-piece, and means by which said carriage may be moved into and out of said working position.

2. Apparatus as defined in claim 1, wherein said carriage is disposed horizontally for movement in a horizontal plane; said work-holding member comprising an arm pivoted at one end to said carriage, and spindle extending upwardly from said arm at its opposite end; said work-piece being cup-shaped so as to fit over said spindle, said grinding belt traveling at its working surface in a vertical direction downwardly.

3. Apparatus as defined in claim 2, wherein said guide means comprise a pair of rollers rotatably mounted on vertical axes on a line substantially parallel to the working surface of said grinding belt, said rollers being spaced from said spindle on either side thereof.

4. Apparatus as defined in claim 3, wherein said arm extends across said endless belt and has a spring urging said work-piece into frictional engagement with said endless belt.

5. Apparatus as defined in claim 4, wherein said spring is provided with adjusting means for varying the force with which said work is urged against said endless belt.

6. Apparatus as defined in claim 1, which further includes means for adjustably moving said carriage laterally in order to vary the distance between said grinding belt and said endless belt.

7. Apparatus as defined in claim 6, wherein said carriage is provided with mounting blocks releasably secured to said frame, said lateral adjusting means therefor comprising set screws mounted on said frame on opposite sides of said mounting blocks and arranged to engage said mounting blocks for positively moving said blocks when they are released from said frame.

8. Apparatus as defined in claim 7, which further includes means for adjusting the tautness of said endless belt in order to vary the resiliency thereof.

No references cited.